United States Patent [19]
Nakazaki

[11] Patent Number: 5,986,220
[45] Date of Patent: Nov. 16, 1999

[54] DEADWEIGHT CALCULATING APPARATUS AND MEDIUM HAVING PROGRAM RECORDED THEREON FOR CALCULATING DEADWEIGHT

[75] Inventor: Yoji Nakazaki, Shizuoka, Japan

[73] Assignee: Yazaki Corporation, Tokyo, Japan

[21] Appl. No.: 08/962,930

[22] Filed: Oct. 30, 1997

[30] Foreign Application Priority Data

Nov. 7, 1996 [JP] Japan ...................................... 8-295032

[51] Int. Cl.$^6$ .......................... G01G 23/18; G01G 19/08; B62D 61/10
[52] U.S. Cl. .......................... 177/45; 177/136; 180/24.02; 702/174
[58] Field of Search ................................. 177/45, 50, 136, 177/137, 138, 139, 141, 177; 180/24.02; 702/174

[56] References Cited

U.S. PATENT DOCUMENTS

| | | | |
|---|---|---|---|
| 3,826,319 | 7/1974 | Loshbough | 177/25.13 |
| 4,606,419 | 8/1986 | Perini | 177/138 |
| 4,651,838 | 3/1987 | Hamilton et al. | 177/141 |
| 4,854,406 | 8/1989 | Appleton et al. | 177/139 |
| 5,393,936 | 2/1995 | Tyhy et al. | 177/138 |
| 5,775,448 | 7/1998 | Hiahara et al. | 180/24.02 |

FOREIGN PATENT DOCUMENTS

| | | | |
|---|---|---|---|
| 195 36 688 | 5/1996 | Germany. | |
| 44 24 88 | 5/1996 | Germany. | |
| 8-50054 | 2/1996 | Japan | G01G 19/08 |

*Primary Examiner*—Randy W. Gibson
*Attorney, Agent, or Firm*—Sughrue, Mion, Zinn, Macpeak & Seas, PLLC

[57] ABSTRACT

A deadweight calculating apparatus including a deadweight calculating section for calculating deadweight of a vehicle provided with a start assisting unit for urging and pressing drive wheels to a road surface in response to signals output from sensors arranged to measure loads and attached to the vehicle. The apparatus further includes an assisting operation detection section for detecting whether or not the drive wheels are being urged and pressed to the road surface by the start assisting unit, and a calculation interrupting section for causing the deadweight calculating section to interrupt a calculation of the deadweight of the vehicle during a period in which the assisting operation detection section detects a fact that the drive wheels are being urged and pressed to the road surface by the start assisting unit.

7 Claims, 5 Drawing Sheets

PRIOR ART though the above-mentioned design of the vehicle is
DEADWEIGHT CALCULATING APPARATUS AND MEDIUM HAVING PROGRAM RECORDED THEREON FOR CALCULATING DEADWEIGHT

BACKGROUND OF THE INVENTION

1. Field of the Invention

The present invention relates to a deadweight calculating apparatus for displaying weight loaded on the bed of a vehicle for carrying cargo to prevent overload.

2. Description of the Related Art

As a general rule, a deadweight calculating apparatus for calculating the deadweight of a vehicle has sensors disposed adjacent to front and rear wheels of the vehicle to detect loads applied to the front and rear wheels to calculate the weight in response to signals output from the sensors. Moreover, the calculated deadweight is displayed on a display unit, if necessary. If the deadweight is too heavy, an alarm is issued.

By the way, in recent years, design has been attempted such that the conventional weight distribution, in which heavier loads are applied to the rear wheels, is changed and loads are equally applied to the front and rear wheels in order to improve the balance among the front and rear wheels.

Although the above-mentioned design of the vehicle is considerably advantageous from a viewpoint of improving safety during drive of the vehicle because the load balance between the front and rear portions of the vehicle can be kept equally in a state where a cargo is loaded on the vehicle, the ground pressure of the drive wheels, which are generally provided for the rear wheels, is too low when, for example, the vehicle starts at a slope, to result in slippage occurring attributable to running at idle.

Accordingly, the vehicles of the type having the improved weight distribution between the front and rear wheels have been increasingly provided with pressure-type start assisting units arranged to be operated when the vehicle is started at a slope or the like so that insufficiently low ground pressure of the drive wheels to the road surface is supplemented.

Figure 5:
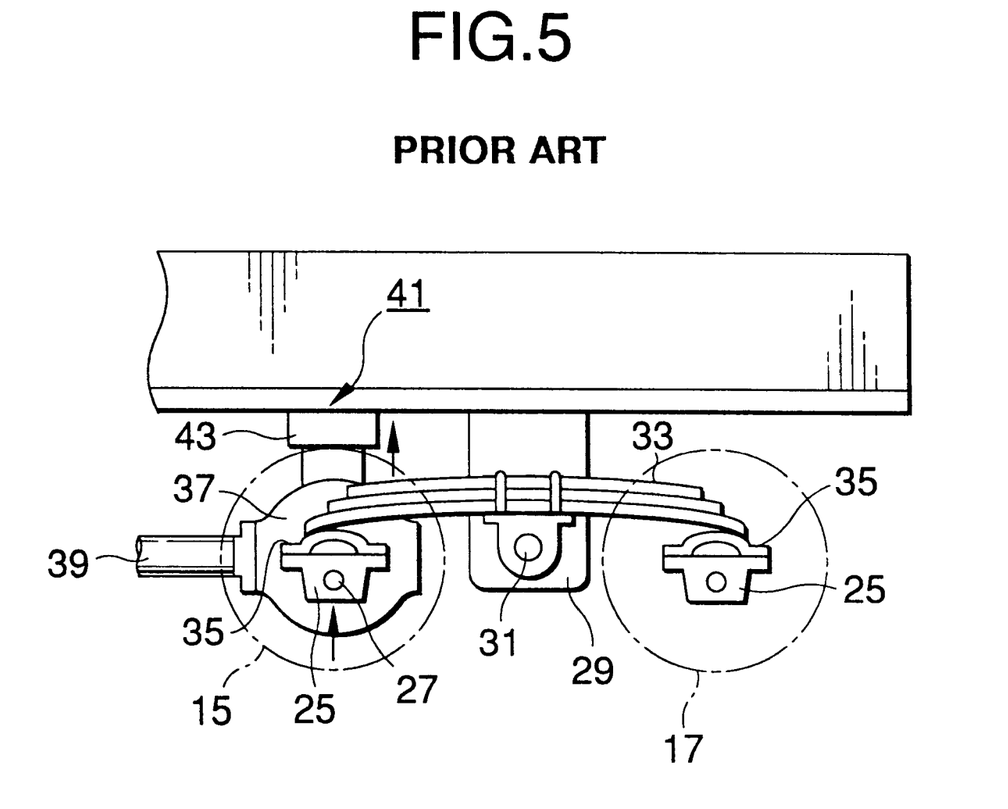
FIG. 5 is a diagram showing the schematic structure of an essential portion of a vehicle having a pressure-type start assisting unit.

FIG. 5 is a schematic view showing the structure of a vehicle having the above-mentioned pressure-type start assisting unit. FIG. 5 shows a two-axle rear wheel portion of the vehicle in an enlarged manner.

Front wheels of the rear wheel portion designated by reference numeral 15 and rear wheels of the rear wheel portion designated by reference numeral 17 are respectively attached to the both ends of axles 27 through axle cases 25. The axle cases 25 are, through a slide plate 35, attached to two longitudinal ends of a leaf spring 33 having an intermediate portion received by a trunnion shaft 31 supported by a trunnion bracket 29 disposed on the lower surface of a platform frame 19.

A drive shaft 39 is, through a differential case 37, connected to the axle 27 of the rear-front wheels 15 so that the rear-front wheels 15 act as drive wheels because drive power is transmitted from an engine (not shown) through the drive shaft 39, the differential case 37 and the axle 27.

A pressure-type start assisting unit 41 for supplmenting the ground pressure of the rear-front wheels 15 against the road surface has an air-pressure or hydraulic cylinder 43 disposed between the platform frame 19 and the differential case 37, a fluid supply source (not shown) for supplying compressed air or pressurized oil, that is, fluid to extend and contract the cylinder 43, and a controller (not shown) for controlling supply of fluid from the fluid supply source to the cylinder 43.

When a switch of the start assisting unit 41 having the above-mentioned structure is operated to start the vehicle at, for example, a slope, fluid is supplied from the fluid supply source to the cylinder 43. Thus, the cylinder 43 is extended, thus causing the distance from the platform frame 19 to the differential case 37 to be extended. As a result, the rear-front wheels 15 is urged and pressed against the road surface so that the ground pressure of the rear-front wheels 15 against the road surface is raised. Thus, generation of slippage can be prevented.

By the way, when the foregoing start assisting unit 41 is operated, extension of the cylinder 43 results in reaction force applied from the road surface portion being applied to the slide plate 35, the axle case 25, the trunnion bracket 29 and the trunnion shaft 31, as indicated with arrows in FIG. 5.

However, since the foregoing elements are disposed in the portions in which sensors of the foregoing deadweight calculating apparatus have been disposed, there arises a problem in that calculations of the deadweight in accordance with outputs from the sensors, which are performed when the start assisting unit is operated, result in a value smaller than actual deadweight being undesirably obtained by a degree corresponding to the reaction force which is applied from the road surface portion because the cylinder 43 is extended.

When the obtained deadweight is arranged to be displayed or an alarm is arranged to be issued if the obtained deadweight is an overload level, there arises a problem in that incorrect deadweight is communicated or the alarm for sounding overload cannot be issued.

SUMMARY OF THE INVENTION

In view of the foregoing, an object of the present invention is to provide a deadweight calculating apparatus which is capable of preventing incorrect calculation of deadweight when a start assisting unit for urging and pressing the drive wheels to the road surface is operated and to provide a medium having a program recorded thereon for calculating deadweight for use in the foregoing apparatus to calculate the deadweight.

To achieve the above-mentioned object, the present invention provides a deadweight calculating apparatus comprising: deadweight calculating means for calculating deadweight of a vehicle provided with a start assisting unit for urging and pressing drive wheels to a road surface in response to signals output from sensors arranged to measure loads and attached to the vehicle; assisting operation detection means for detecting whether or not the drive wheels are being urged and pressed to the road surface by the start assisting unit; and calculation interrupting means for causing the deadweight calculating means to interrupt a calculation of the deadweight of the vehicle during a period in which the assisting operation detection means detects a fact that the drive wheels are being urged and pressed to the road surface by the start assisting unit.

Further, the present invention provides a medium having a program for calculating deadweight recorded thereon, the program being arranged to cause deadweight calculating means to calculate the deadweight of a vehicle provided with a start assisting unit for urging and pressing drive wheels to a road surface in response to signals output from sensors arranged to measure loads and attached to the vehicle, wherein the program operates a computer to serve as assisting operation detection means for detecting whether or not the drive wheels are being urged and pressed to the road surface by the start assisting unit and calculation interrupting means for causing the deadweight calculating means to interrupt a calculation of the deadweight of the vehicle during a period in which the assisting operation detection means detects a fact that the drive wheels are being urged and pressed to the road surface by the start assisting unit.

DETAILED DESCRIPTION OF THE PREFERRED EMBODIMENT

First, the basic structure of a deadweight calculating apparatus according to the present invention will be described.

Figure 1:
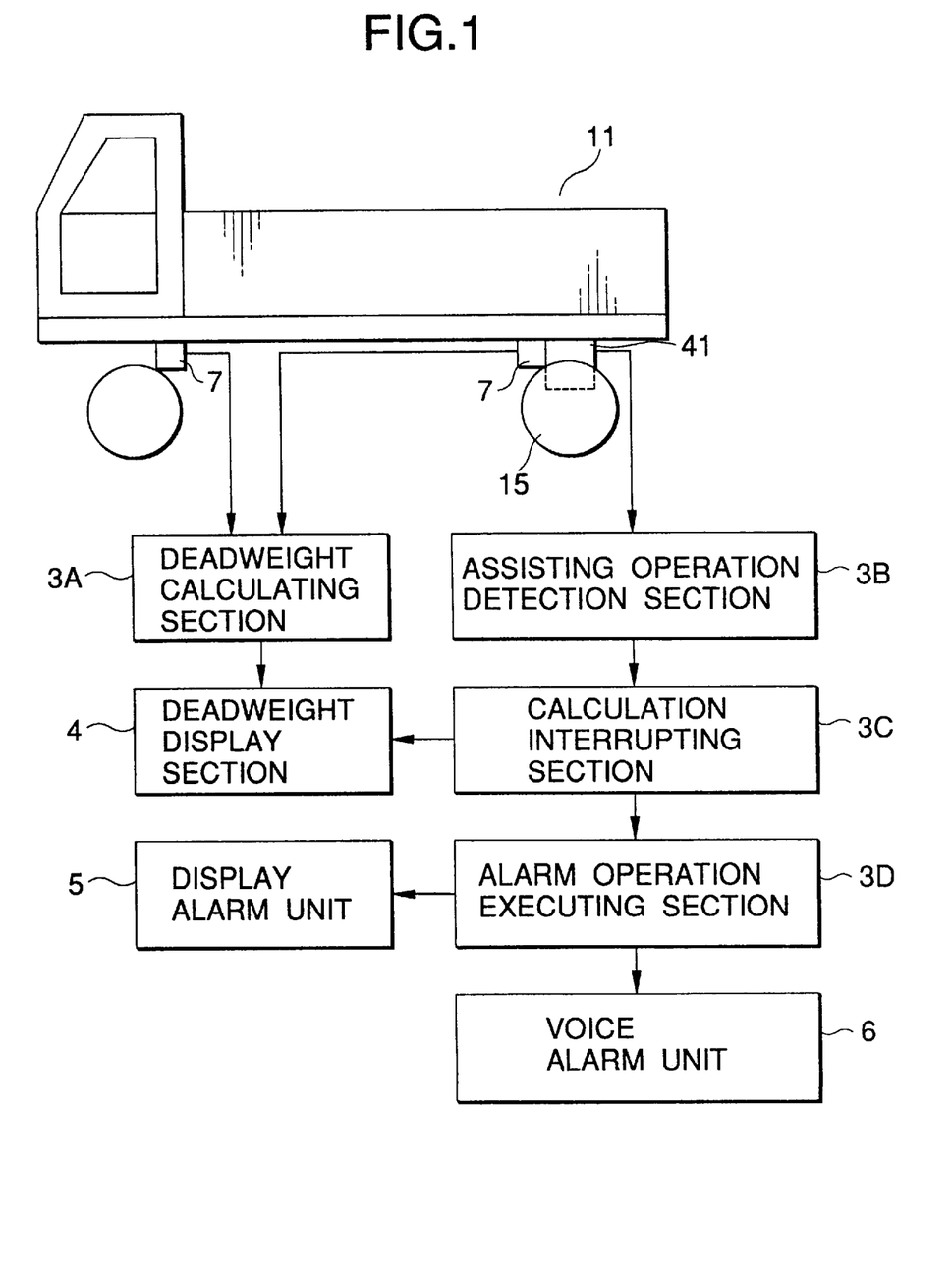
FIG. 1 is a diagram showing the basic structure of a deadweight calculating apparatus according to the present invention.

In FIG. 1, the deadweight calculating apparatus includes a deadweight calculating section 3A for calculating deadweight of a vehicle 11 provided with a start assisting unit 41 for urging and pressing drive wheels 15 to a road surface in response to signals output from sensors 7 arranged to measure loads and attached to the vehicle 11. The deadweight calculating apparatus further includes an assisting operation detection section 3B for detecting whether or not the drive wheels 15 are being urged and pressed to the road surface by the start assisting unit 41, and a calculation interrupting section 3C for causing the deadweight calculating section 3A to interrupt a calculation of the deadweight of the vehicle 11 during a period in which the assisting operation detection section 3B detects a fact that the drive wheels 15 are being urged and pressed to the road surface by the start assisting unit 41.

The deadweight calculating apparatus further includes a deadweight display section 4 for displaying the deadweight of the vehicle 11 calculated by the deadweight calculating section 3A, wherein the deadweight of the vehicle 11 which is displayed on the deadweight display section 4 during a period in which the calculation interrupting section 3C causes the deadweight calculating section 3A to interrupt the calculation of the deadweight of the vehicle 11 is kept to be the deadweight of the vehicle 11 which has been displayed on the deadweight display section 4 immediately before the assisting operation detection section 3B detects the fact that the drive wheels 15 are urged and pressed to the road surface by the start assisting unit 41.

The deadweight calculating apparatus further includes a display alarm unit 5 for displaying an alarm sign which can be visually recognized, a voice alarm unit 6 for emitting alarm sound, and an alarm operation executing section 3D for operating the display alarm unit 5 and the voice alarm unit 6 during the period in which the assisting operation detection section 3B detects a fact that the drive wheels 15 are being urged and pressed to the road surface by the start assisting unit 41.

A medium having a program for calculating deadweight recorded thereon according to the present invention, the program being arranged to cause the deadweight calculating section to calculate the deadweight of the vehicle provided with the start assisting unit for urging and pressing drive wheels to the road surface in response to signals output from the sensors arranged to measure loads and attached to the vehicle, has a structure that the program operates a computer to serve as the assisting operation detection section for detecting whether or not the drive wheels are being urged and pressed to the road surface by the start assisting unit and the calculation interrupting section for causing the deadweight calculating section to interrupt a calculation of the deadweight of the vehicle during a period in which the assisting operation detection section detects a fact that the drive wheels are being urged and pressed to the road surface by the start assisting unit.

Further, the medium according to the present invention has a structure that the program operates the computer to further serve as the alarm operation executing section for operating an assisting operation alarming section for alarming the operation of the start assisting unit during the period in which the assisting operation detection section detects a fact that the drive wheels are being urged and pressed to the road surface by the start assisting unit. Here, the assisting operation alarming section includes the display alarm unit and the voice alarm unit.

According to the deadweight calculating apparatus of the present invention, reaction force is applied from the road surface to the vehicle 11 through the drive wheels 15 when the start assisting unit 41 urges and presses the drive wheels 15 to the road surface. Even if an output signal from the sensor 7 for measuring the load is changed attributable to an influence of the reaction force, the calculation of the deadweight of the vehicle 11, which is performed by the deadweight calculating section 3A, has been interrupted by the calculation interrupting section 3C at this time in response to the operation of the assisting operation detection section 3B to detect the operation of the start assisting unit 41. Therefore, incorrect calculation of the deadweight can be prevented which is performed by the deadweight calculating section 3A in accordance with the outputs from the sensors 7, the signal from which has been changed attributable to the influence of the operation of the start assisting unit 41.

Further, according to the deadweight calculating apparatus of the present invention, interruption of display of the deadweight on the deadweight display section 4 can be prevented during a period in which the calculation of the deadweight, which is performed by the deadweight calculating section 3A, is interrupted by the calculation interrupting section 3C when the deadweight of the vehicle 11 calculated by the deadweight calculating section 3A is displayed on the deadweight display section 4 because increase or decrease in the deadweight owning to loading or unloading of a cargo does not substantially take place when start of the vehicle 11, at which the start assisting unit 41 is operated, is performed. Therefore, accurate deadweight can be continuously displayed.

Moreover, according to the deadweight calculating apparatus of the present invention, the display alarm unit 5 displays an alarm sign when the calculation of the deadweight, which is performed by the deadweight calculating section 3A, is interrupted. Therefore, even if the vehicle 11 is in a noisy place, the operation of the start assisting unit 41 and resulted interruption of the calculation of the deadweight, which is performed by the deadweight calculating section 3A, can be recognized by the driver. Further, the voice alarm unit 6 issues alarm sound when the calculation of the deadweight, which is performed by the deadweight calculating section 3A, is interrupted. As a result, even if the driver turns his eyes away from the deadweight calculating apparatus, the operation of the start assisting unit 41 and interruption of the calculation, which is performed by the deadweight calculating section 3A, can be recognized by the driver.

According to the medium of the present invention, the recorded program operates the computer to cause the calculation interrupting section to interrupt the calculation of the deadweight of the vehicle, which is performed by the deadweight calculating section, in response to a fact that the assisting operation detection section detects the operation of the start assisting unit even if the output signal from the sensor arranged to measure loads and attached to the vehicle is changed owning to an influence of reaction force which is applied from the road surface to the vehicle through the drive wheels when the drive wheels are urged and pressed to the road surface by the start assisting unit. Therefore, calculation of incorrect deadweight can be prevented which is performed by the deadweight calculating section owning to an output from the sensor, the signal from which is changed attributable to the influence of the operation of the start assisting unit.

Further, according to the medium of the present invention, the recorded program operates the computer to cause the alarm operation executing section to operate the assisting operation alarm section during a period in which the assisting operation detection section detects the operation of the start assisting unit. Therefore, interruption of the calculation of the deadweight of the vehicle which is performed by the deadweight calculating section can be communicated to the driver.

Hereinafter, an embodiment of the present invention will be described with reference to FIG. 2.

Figure 2:
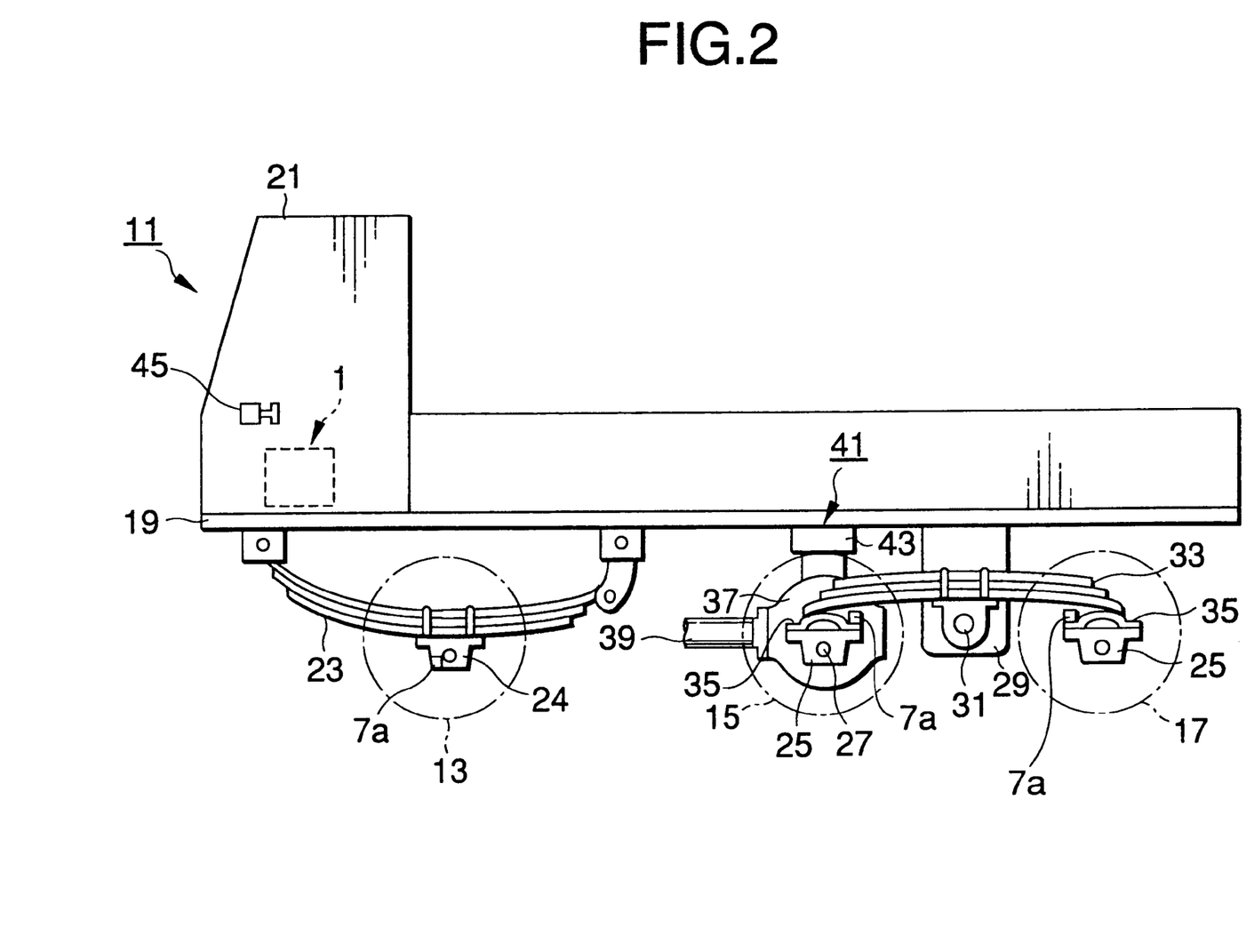
FIG. 2 is a diagram showing the schematic structure of a vehicle having a start assisting unit to which the present invention is applied.

FIG. 2 is a diagram showing the schematic structure of a vehicle having a start assisting unit to which the present invention is applied. Referring to FIG. 2, the same elements and portions as those shown in FIG. 5 are given the same reference numerals and description thereof is omitted here.

A vehicle designated by reference numeral 11 in FIG. 2 has uniaxial front wheels (wheels to be steered) 13 and front wheels 15 of a rear wheel portion and rear wheels 17 of the rear wheel portion supported by two axles. The front wheels 13 are, through a leaf spring 23, a slide plate 24 and the like, supported on the lower surface of a portion in front of a platform frame 19 and having a cabin 21.

On the other hand, the front wheels 15 of the rear wheel portion and the rear wheels 17 of the rear wheel portion are attached to the both ends of axles 27 through axle cases 25 respectively. The axle cases 25 are, through slide plates 35, attached to two longitudinal ends of a leaf spring 33 having an intermediate portion attached to a trunnion shaft 31 supported by a trunnion bracket 29 disposed on the lower surface of the platform frame 19.

A drive shaft 39 is connected to the axle 27 of the front wheels 15 of the rear wheel portion through a differential case 37. Power transmitted from an engine (not shown) through the drive shaft 39, the differential case 37 and the axle 27 rotates the front wheels 15 of the rear wheel portion to act as the drive wheels.

A pressure-type start assisting unit 41 for supplementing the ground pressure of the front wheels 15 of the rear wheel portion against the road surface has an air-pressure or hydraulic cylinder 43 disposed between the platform frame 19 and the differential case 37 and a supply source (not shown) for supplying compressed air or pressurized oil, that is, fluid for extending or compressing the cylinder 43. The fluid supply source has a known compressor which is operated with power supplied from the engine and a switch valve (not shown) for switching the direction, in which fluid is supplied between the compressor and the cylinder 43.

Further, the start assisting unit 41 has an operation switch 45 with which the operation is instructed, the operation switch 45 being disposed in a portion of the cabin 21 which can be easily operated by a driver.

Figure 3:
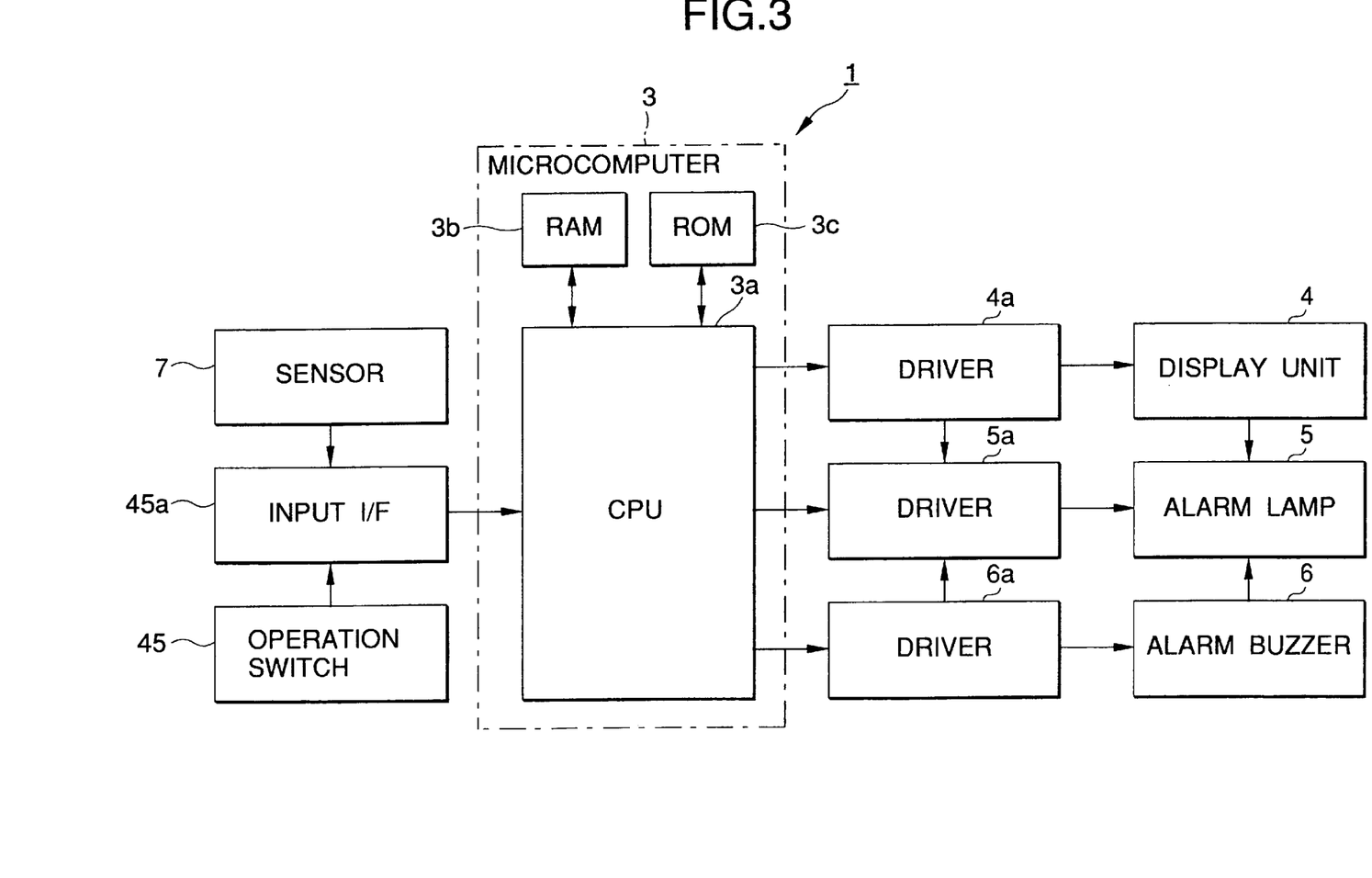
FIG. 3 is a block diagram showing an embodiment of the deadweight calculating apparatus using a medium having a program for calculating the deadweight according to the present invention to calculate the deadweight of the vehicle shown in FIG. 2.

FIG. 3 is a block diagram showing an embodiment of the deadweight calculating apparatus using a medium having a deadweight calculating program for calculating the deadweight of the vehicle shown in FIG. 2. Referring to FIG. 3, the deadweight calculating apparatus designated by reference numeral 1 and according to this embodiment is disposed in the cabin 21 of the vehicle 11, as shown in FIG. 2 and comprises a microcomputer 3, a display unit 4 for displaying the deadweight, an alarm lamp 5, an alarm buzzer 6 and sensors 7 for measuring loads, as shown in FIG. 3.

Each of the sensors 7 according to this embodiment comprises a known strain-gauge-type sensor comprising a strain-gauge-type sensing device 7a (see FIG. 2) which outputs a frequency, which is changed when the load is changed while forming the frequency into a signal indicated with a voltage level by an F/V converter (not shown). The sensing devices 7a are, as shown in FIG. 2, respectively attached to the slide plate 24 of the front wheels 13 and the slide plates 35 of the front wheels 15 of the rear wheel portion and the rear wheels 17 of the rear wheel portion or respectively attached to a shackle (not shown in FIG. 2) of the front wheels 13 and the trunnion bracket 29 for the front wheels 15 of the rear wheel portion and the rear wheels 17 of the rear wheel portion.

The microcomputer 3 also serves as a controller for the start assisting unit 41 and comprises a CPU (Central Processing Unit) 3a, a RAM (Random Access Memory) 3b and a ROM (Read-Only Memory) 3c.

The RAM 3b and ROM 3c are connected to the CPU 3a. Moreover, the operation switch 45 of the start assisting unit 41 and the sensors 7 are connected to the CPU 3a through an input interface 45a. In addition, the display unit 4, the alarm lamp 5 and the alarm buzzer 6 are connected to the CPU 3a through drivers 4a, 5a and 6a.

The RAM 3b has a data area in which various data items are stored, and a working area in which various operations are performed. In the ROM 3c, there is stored a control program for causing the CPU 3a to perform various operations.

The process, which is performed by the CPU 3a in accordance with the control program stored in the ROM 3c, will now be described with reference to a flow chart shown in FIG. 4.

When electric power is supplied and thus the microcomputer 3 is turned on because an accessory switch (not shown) of the vehicle 11 is turned on, the CPU 3a confirms whether or not the operation switch 45 has been turned on to confirm whether or not the start assisting unit 41 has been operated (step S1). If the switch is turned off (N in step S1), the CPU 3a performs a process for calculating the deadweight of the vehicle 11 in accordance with output signals from the sensors 7 (step S3). Then, the CPU 3a updates, to the deadweight calculated in step S3, the display on the display unit 4 through the driver 4a (step S5). Then, the operation returns to step S1.

On the other hand, if the operation switch 45 is, in step S1, turned on (Y), the deadweight which is being displayed on the display unit 4 at present is fixed through the driver 4a (step S7). Moreover, the alarm lamp 5 is turned on through the driver 5a (step S9), and the alarm buzzer 6 is sounded through the driver 6a (step S11). Then, whether or not the operation switch 45 is turned on is confirmed (step S13).

When the operation switch 45 is, in step S13, turned on (Y), step S13 is repeated until the operation switch 45 is not turned on. If the operation switch 45 is not turned on (N in step S13), the display of the deadweight fixed in step S7 on the display unit 4 is suspended through the driver 4a (step S15). Then, the alarm lamp 5 is turned off through the driver 5a (step S17), and then sounding of the alarm buzzer 6 is stopped through the driver 6a (step S19). Then, the operation returns to step S1.

Figure 4:
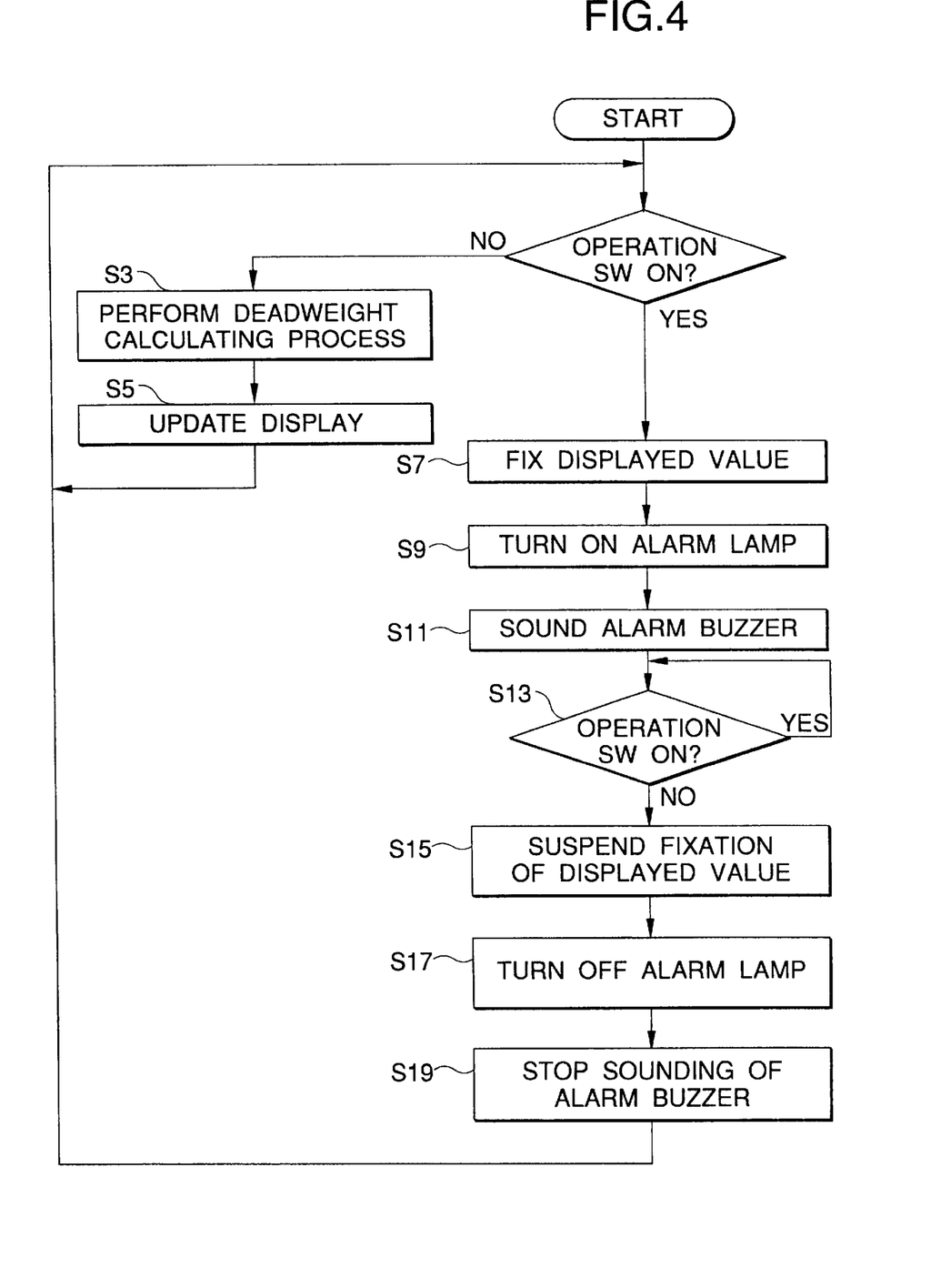
FIG. 4 is a flow chart of a process which is performed by a CPU in accordance with a control program stored in a ROM of a microcomputer shown in FIG. 3.

As described above, the deadweight calculating section 3A is realized by step S3 in the flow chart shown in FIG. 4, the assisting operation detection section 3B is realized by step S1 and step S13 shown in FIG. 4, and the calculation interrupting section 3C is realized by step S7 and step S15 shown in FIG. 4. Moreover, the alarm operation executing section 3D is realized by step S9, step S11, step S17 and step S19 shown in FIG. 4.

The medium having the program for calculating the deadweight recorded thereon in this embodiment is realized by the ROM 3c of the microcomputer 3.

The operation (action) of the deadweight calculating apparatus 1 structured as described above and according to this embodiment will now be described.

If the calculation of the deadweight by using the sensors 7 can be performed in a case where, for example, the vehicle is stopped, the microcomputer 3 calculates the deadweight of the vehicle 11 in accordance with output signals from the sensors 7 of the front wheels 13, the front wheels 15 of the rear wheel portion and the rear wheels 17 of the rear wheel portion. The obtained deadweight is displayed on the display unit 4. The displayed deadweight is updated when the obtained value is changed attributable of, for example, loading and unloading of a cargo.

When the operation switch 45 of the start assisting unit 41 is turned on by the driver in a case where start of the vehicle by using the start assisting unit 41 is required when, for example, the vehicle 11 is started at a slope in a case where no cargo is loaded or the deadweight is smaller than a predetermined value, the process (not shown in FIG. 4) performed by the CPU 3a in accordance with the control program stored in the ROM 3c causes fluid to flow from the fluid supply source to a cylinder chamber (not shown) of the cylinder 43. Thus, the cylinder 43 is extended so that the front wheels 15 of the rear wheel portion are urged and pressed to the road surface.

When the operation switch 45 of the start assisting unit 41 is turned on, the calculation of the deadweight in accordance with the output signals from the sensors 7 is not performed from then on in parallel to the extension of the cylinder 43. The deadweight displayed on the display unit 4 is fixed to the value calculated and displayed immediately before the operation switch 45 is turned on.

When the operation switch 45 is turned off by the driver subsequent to that, the process (not shown in FIG. 4) performed by the CPU 3a causes fluid to be supplied from the fluid supply source to a cylinder chamber (not shown) opposite to the above-mentioned cylinder chamber across a piston (not shown) so that the cylinder is contracted. As a result, urging and pressing of the front wheels 15 of the rear wheel portion to the road surface are suspended. Moreover, the fixation of the display of the deadweight on the display unit 4 to the value calculated and displayed immediately before the operation switch 45 is turned on is suspended.

Then, the calculation of the deadweight in accordance with the output signals from the sensors 7 is restarted so that the deadweight displayed on the display unit 4 is updated to deadweight calculated in accordance with output signals from the sensors 7 after the operation switch 45 has been turned off.

As described above, the deadweight calculating apparatus 1 according to this embodiment is arranged to interrupt the calculation of the deadweight in accordance with the output signals from the sensors 7 when the driver turns on the operation switch 45 of the start assisting unit 41 and the extension of the cylinder 43 causes the front wheels 15 of the rear wheel portion to be urged and pressed to the road surface when start of a vehicle using the start assisting unit 41 is required in a case where, for example, the vehicle 11 is started at a slope in a state where no cargo is loaded or in a state where the deadweight is smaller than a predetermined value. Thus, the deadweight displayed on the display unit 4 is fixed to the value calculated and displayed immediately before the operation switch 45 is turned on.

Therefore, even if the influence of the reaction force applied from the road surface to the vehicle 11 through the front wheels 15 of the rear wheel portion attributable to urging and pressing of the front wheels 15 of the rear wheel portion to the road surface when the cylinder 43 is extended changes the degrees of distortion of the sensing devices 7a respectively attached to the slide plate 24 of the front wheels 13 and the slide plates 35 of the front wheels 15 of the rear wheel portion and the rear wheels 17 of the rear wheel portion and the output signals from the sensors 7, calculation of the deadweight in accordance with the changed output signals from the sensors 7 is interrupted. The deadweight displayed on the display unit 4 is fixed to the value calculated and displayed immediately before the operation switch 45 is turned on. Therefore, incorrect calculation of the deadweight in accordance with the outputs from the sensors 7, the signals from which have been changed attributable to the influence of the operation of the start assisting unit 41, and display of the incorrect value on the display unit 4 can be prevented.

The structure for fixing the deadweight, which is displayed on the display unit 4, to the value before the start assisting unit 41 is operated during the operation of the start assisting unit 41 may be omitted in this embodiment. In consideration of a fact that loading and unloading of a cargo and resulted change in the deadweight do not substantially take place when the vehicle 11 is started causing the start assisting unit 41 to be operated, provision of the above-mentioned structure is advantageous because interruption of display of deadweight on the display unit 4 during the operation of the start assisting unit 41 can be prevented and display of correct deadweight can be continued.

Although this embodiment is structured such that the alarm lamp 5 is turned on and the alarm buzzer 6 is operated during the operation of the start assisting unit 41 performed when the operation switch 45 is turned on, either or both of the structures relating to the alarm lamp 5 and the alarm buzzer 6 may be omitted.

However, provision of the structure according to this embodiment in which the alarm lamp 5 is turned on during the operation of the start assisting unit 41 enables the driver to advantageously recognize the operation of the start assisting unit 41 and the interruption of the calculation, which is performed by the microcomputer 3, and a fact that the deadweight displayed on the display unit 4 is fixed to the value calculated and displayed immediately before the operation switch 45 is turned on even if the vehicle 11 is in a noisy place.

Similarly, provision of the structure for sounding the alarm buzzer 6 during the operation of the start assisting unit 41 enables the driver to advantageously recognize the operation of the start assisting unit 41 and the interruption of the calculation, which is performed by the microcomputer 3, and a fact that the deadweight displayed on the display unit 4 is fixed to the value calculated and displayed immediately before the operation switch 45 is turned on even if the driver looks away from the display.

Although this embodiment is structured in such a way that operation of the start assisting unit 41 is detected by monitoring whether or not the operation switch 45 is turned on, another structure may be employed in which detection is performed by monitoring a state of a signal for use in control relating to supply fluid to the cylinder 43.

The above-mentioned structure is advantageous if it is employed in a structure in which the contraction of the extended cylinder 43 is automatically performed regardless of the operation of the operation switch 45 attributable to supply of fluid to the cylinder chamber opposite to the cylinder from the fluid supply source by the process performed by the CPU 3a when the vehicle 11 has started and the running speed has been somewhat accelerated (to, for example, about 20 km/h).

As can be understood also from this, the detailed structure of the start assisting unit 41 and the like according to the present invention are not limited to the structure described in this embodiment.

Although the embodiment has been described about the structure in which the deadweight calculated in accordance with the output signals from the sensors 7 is displayed on the display unit 4, the present invention may be applied to a structure arranged to output the calculated deadweight and having no function of displaying the deadweight as well as the structure for communicating the same to the driver.

Although this embodiment has been described about the structure in which the start assisting unit 41 causes the air-pressure or hydraulic cylinder 43 to urge and press the drive wheels to the road surface, urging and pressing of the drive wheels may be performed by extending and contracting a shaft having a spiral groove around the surface thereof while rotating the same. Thus, the detailed structure of the start assisting unit is not limited to the structure according to this embodiment.

The positions of the cylinder 43 and the shafts according to this embodiment are not limited to the position according to this embodiment between the platform frame 19 and the differential case 37. Similarly, the drive wheels which are urged and pressed to the road surface by the start assisting unit are not limited to the front wheels 15 of the two-axle rear wheel portion. For example, the front wheels may, of course, be urged and pressed if the drive wheels are provided for the front wheels.

According to the deadweight calculating apparatus of the invention, if reaction force is applied from the road surface to the vehicle through the drive wheels when the start assisting unit urges and presses the drive wheels to the road surface and the influence of the reaction force changes the output signals from the sensors arranged to measure loads and attached to the vehicle, calculation of the deadweight of the vehicle which is performed by the deadweight calculating section is, at this time, interrupted by the calculation interrupting section when the assisting operation detection section detects the operation of the start assisting unit. Therefore, calculation of incorrect deadweight which is performed by the deadweight calculating section in accordance with the changed outputs from the sensors attributable to the influence of the operation of the start assisting unit can be prevented.

According to the medium having the program for calculating deadweight recorded thereon of the present invention, even if reaction force is applied from the road surface to the vehicle through the drive wheels when the start assisting unit urges and presses the drive wheels to the road surface and the influence of the reaction force changes the output signals from the sensors attached to the vehicle and arranged to measure loads, the computer causes the calculation interrupting section to interrupt the calculation of the deadweight of the vehicle by the deadweight calculating section when the operation of the start assisting unit is detected by the assisting operation detection section. Therefore, calculation of incorrect deadweight by the deadweight calculating section in accordance with the changed outputs from the sensors, the signals from which have been changed attributable to the influence of the operation of the start assisting unit, can be prevented.

What is claimed is:

1. A deadweight calculating apparatus comprising:
    deadweight calculating means for calculating deadweight of a vehicle provided with a start assisting unit for urging and pressing drive wheels to a road surface in response to signals output from sensors arranged to measure loads and attached to the vehicle;
    assisting operation detection means for detecting whether or not the drive wheels are being urged and pressed to the road surface by said start assisting unit; and
    calculation interrupting means for causing said deadweight calculating means to interrupt a calculation of the deadweight of the vehicle during a period in which said assisting operation detection means detects a fact that the drive wheels are being urged and pressed to the road surface by said start assisting unit.

2. The deadweight calculating apparatus according to claim 1, further comprising deadweight display means for displaying the deadweight of the vehicle calculated by said deadweight calculating means, wherein the deadweight of the vehicle which is displayed on said deadweight display means during a period in which said calculation interrupting means causes said deadweight calculating means to interrupt the calculation of the deadweight of the vehicle is kept to be the deadweight of the vehicle which has been displayed on said deadweight display means immediately before said assisting operation detection means detects the fact that the drive wheels are urged and pressed to the road surface by said start assisting unit.

3. The deadweight calculating apparatus according to claim 1, further comprising assisting operation alarming means for alarming the operation of said start assisting unit and alarm operation executing means for operating said assisting operation alarming means during the period in which said assisting operation detection means detects the fact that the drive wheels are being urged and pressed to the road surface by said start assisting unit.

4. The deadweight calculating apparatus according to claim 3, wherein said assisting operation alarming means includes a display alarm unit for displaying an alarm sign which can be visually recognized.

5. The deadweight calculating apparatus according to claim 3, wherein said assisting operation alarming means includes a voice alarm unit for emitting alarm sound.

6. A medium having a program for calculating deadweight recorded thereon, said program being arranged to cause deadweight calculating means to calculate the deadweight of a vehicle provided with a start assisting unit for urging and pressing drive wheels to a road surface in response to signals output from sensors arranged to measure loads and attached to the vehicle, wherein said program operates a computer to serve as assisting operation detection means for detecting whether or not the drive wheels are being urged and pressed to the road surface by said start assisting unit and calculation interrupting means for causing said deadweight calculating means to interrupt a calculation of the deadweight of the vehicle during a period in which said assisting operation detection means detects a fact that the drive wheels are being urged and pressed to the road surface by said start assisting unit.

7. The medium according to claim 6, wherein said program operates the computer to further serve as alarm operation executing means for operating assisting operation alarming means for alarming the operation of said start assisting unit during the period in which said assisting operation detection means detects the fact that the drive wheels are being urged and pressed to the road surface by said start assisting unit.

* * * * *